US009066359B2

(12) United States Patent
Hulkkonen et al.

(10) Patent No.: US 9,066,359 B2
(45) Date of Patent: Jun. 23, 2015

(54) INTERFERENCE MANAGEMENT FOR COEXISTING RADIO SYSTEMS

(75) Inventors: Jari Yrjana Hulkkonen, Oulu (FI); Mikko Saily, Sipoo (FI); Seppo Ilmari Vesterinen, Oulunsalo (FI); Esa Tapani Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/883,011

(22) PCT Filed: Nov. 11, 2010

(86) PCT No.: PCT/EP2010/067264
§ 371 (c)(1),
(2), (4) Date: May 2, 2013

(87) PCT Pub. No.: WO2012/062364
PCT Pub. Date: May 18, 2012

(65) Prior Publication Data
US 2013/0225159 A1    Aug. 29, 2013

(51) Int. Cl.
*H04B 1/00* (2006.01)
*H04W 72/08* (2009.01)
*H04W 16/14* (2009.01)
*H04W 24/02* (2009.01)

(52) U.S. Cl.
CPC ............ *H04W 72/082* (2013.01); *H04W 16/14* (2013.01); *H04W 72/085* (2013.01); *H04W 24/02* (2013.01)

(58) Field of Classification Search
CPC ............ H04W 16/14; H04M 1/72519; H04B 1/0475; H04B 1/12
USPC .......................... 455/63.1, 550.1, 114.2, 423
See application file for complete search history.

(56) References Cited

U.S. PATENT DOCUMENTS

| | | | |
|---|---|---|---|
| 6,865,185 B1* | 3/2005 | Patel et al. ................... | 370/412 |
| 7,843,970 B2* | 11/2010 | Yang ............................ | 370/498 |
| 2003/0050071 A1* | 3/2003 | Shurvinton ................... | 455/452 |
| 2004/0242158 A1* | 12/2004 | Fattouch et al. ............. | 455/63.1 |
| 2009/0060094 A1* | 3/2009 | Jung et al. ..................... | 375/340 |
| 2010/0255867 A1* | 10/2010 | Ishii et al. .................... | 455/501 |

(Continued)

FOREIGN PATENT DOCUMENTS

EP    2 120 475 A1    11/2009
WO    WO 2010091717 A1    8/2010

OTHER PUBLICATIONS

3GPP TSG RAN WG1 #55-bis Meeting Ljubljana, Slovenia, Jan. 12-16, 2009, R1-090235, Nokia Siemens Networks, Nokia, "Use of Background Interference Matrix for Autonomous Component Carrier Selection for LTEAdvanced"; 7 pgs.
Report ITU-R M.2225 (2011), Introduction to cognitive radio systems in the land mobile service, M Series.

(Continued)

*Primary Examiner* — Danh Le
(74) *Attorney, Agent, or Firm* — Harrington & Smith (57) ABSTRACT

The invention relates to apparatuses, a method, computer program and computer-readable medium for resource allocation (selection of channel and maximum allowed transmission power) in a coexisting secondary communications system, overlapping with a primary system. Allocation is performed based on an interference table indicating measured interference per cell of the primary system from other cells of the primary and secondary system.

28 Claims, 2 Drawing Sheets

(56) References Cited

U.S. PATENT DOCUMENTS

2010/0285810 A1* 11/2010 Ko et al. ............... 455/450
2013/0208604 A1* 8/2013 Lee et al. ............... 370/252

OTHER PUBLICATIONS

Salmenkaita et al., "Optimizing the GSM/EDGE Air Interference for Multiple Services with Dynamic Frequency and Channel Assignment"; VTC 2002-Fall, IEEE 56th; pp. 2215-2219.

* cited by examiner

INTERFERENCE MANAGEMENT FOR COEXISTING RADIO SYSTEMS

FIELD

The invention relates to apparatuses, methods, computer programs, computer program products and a computer-readable medium.

BACKGROUND

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Recently need for more efficient usage of radio resources has brought out an idea of co-existence or sharing of systems meaning that systems share operational resources, for example spectrum in a given region. This puts forward new challenges to interference management.

BRIEF DESCRIPTION

According to an aspect of the present invention, there is provided an apparatus comprising: at least one processor and at least one memory including a computer program code, the at least one memory and the computer program code configured to, with the at least one processor, cause the apparatus at least to: create an interference estimate storage linking interference estimates of at least one primary communication entity and at least one secondary communication entity for interference management in resource sharing, the storage comprising: a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

According to another aspect of the present invention, there is provided an apparatus suitable for using the interference estimate storage of preceding claims, the apparatus comprising: at least one processor and at least one memory including a computer program code, the at least one memory and the computer program code configured to, with the at least one processor, cause the apparatus at least to: check availability of a resource; if available, generate from the interference estimate storage at least one interference estimate of interference from the at least one secondary communication entity to the at least one primary communication entity; define an upper limit for transmission power for the at least one secondary communication entity based on the at least one interference estimate, and generate a transmission allowance message for the at least one secondary communication entity, the message comprising information on the upper limit for transmission power.

According to another aspect of the present invention, there is provided a method comprising: creating an interference estimate storage linking interference estimates of at least one primary communication entity and at least one secondary communication entity for interference management in resource sharing, the storage comprising: a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

According to yet another aspect of the present invention, there is provided a method, wherein the interference estimate storage of preceding claims is used, the method comprising: checking availability of a resource; if available, generating from the interference estimate storage at least one interference estimate of interference from the at least one secondary communication entity to the at least one primary communication entity; defining an upper limit for transmission power for the at least one secondary communication entity based on the at least one interference estimate, and generating a transmission allowance message for the at least one secondary communication entity, the message comprising information on the upper limit for transmission power.

According to yet another aspect of the present invention, there is provided an apparatus comprising: means for creating an interference estimate storage linking interference estimates of at least one primary communication entity and at least one secondary communication entity for interference management in resource sharing, the storage comprising: a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

According to yet another aspect of the present invention, there is provided an apparatus suitable for using the interference estimate storage of a preceding claim, the apparatus comprising: means for checking availability of a resource; if available, means for generating from the interference estimate storage at least one interference estimate of interference from the at least one secondary communication entity to the at least one primary communication entity; means for defining an upper limit for transmission power for the at least one secondary communication entity based on the at least one interference estimate, and means for generating a transmission allowance message for the at least one secondary communication entity, the message comprising information on the upper limit for transmission power.

According to yet another aspect of the present invention, there is provided computer program embodied on a computer-readable storage medium, the computer program comprising program code for controlling a process to execute a process, the process comprising: creating an interference estimate storage linking interference estimates of at least one primary communication entity and at least one secondary communication entity for interference management in resource sharing, the storage comprising: a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

According to yet another aspect of the present invention, there is provided a computer program embodied on a computer-readable storage medium, the computer program comprising program code for controlling a process to execute a process wherein the interference estimate storage of preceding claims is used, the process comprising: checking availability of a resource; if available, generating from the interference estimate storage at least one interference estimate of interference from the at least one secondary communication entity to the at least one primary communication entity; defining an upper limit for transmission power for the at least one secondary communication entity based on the at least one interference estimate, and generating a transmission allowance message for the at least one secondary communication entity, the message comprising information on the upper limit for transmission power.

According to yet another aspect of the present invention, there is provided computer-readable medium encoded with instructions that, when executed by a computer, perform: creating an interference estimate storage linking interference estimates of at least one primary communication entity and at least one secondary communication entity for interference management in resource sharing, the storage comprising: a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

LIST OF DRAWINGS

Embodiments of the present invention are described below, by way of example only, with reference to the accompanying drawings, in which.

DESCRIPTION OF EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Embodiments are applicable to any user device, such as a user terminal, relay node, server, node, corresponding component, and/or to any communication system or any combination of different communication systems that support required functionalities. The communication system may be a wireless communication system or a communication system utilizing both fixed networks and wireless networks. The protocols used, the specifications of communication systems, apparatuses, such as servers and user terminals, especially in wireless communication, develop rapidly. Such development may require extra changes to an embodiment. Therefore, all words and expressions should be interpreted broadly and they are intended to illustrate, not to restrict, embodiments.

In the following, different embodiments will be described using, as an example of an access architecture to which the embodiments may be applied, a radio access architecture based on long term evolution (LTE) Advanced, LTE-A, that is based on orthogonal frequency multiplexed access (OFDMA) in a downlink and a single-carrier frequency-division multiple access (SC-FDMA) in an uplink, without restricting the embodiments to such an architecture, however.

In an orthogonal frequency division multiplexing (OFDM) system, the available spectrum is divided into multiple orthogonal sub-carriers. In OFDM systems, available bandwidth is divided into narrower sub-carriers and data is transmitted in parallel streams. Each OFDM symbol is a linear combination of signals on each of the subcarriers. Further, each OFDM symbol is preceded by a cyclic prefix (CP), which is used to decrease Inter-Symbol Interference. Unlike in OFDM, SC-FDMA subcarriers are not independently modulated.

Typically, a (e)NodeB needs to know channel quality of each user device and/or the preferred precoding matrices (and/or other multiple input-multiple output (MIMO) specific feedback information, such as channel quantization) over the allocated sub-bands to schedule transmissions to user devices. Required information is usually signalled to the (e)NodeB.

Figure 1:
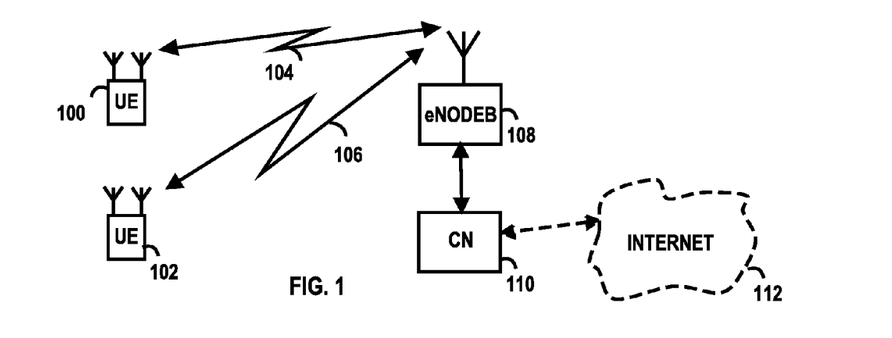
FIG. 1 illustrates an example of a system.

FIG. 1 is an example of a simplified system architecture only showing some elements and functional entities, all being logical units whose implementation may differ from what is shown. The connections shown in FIG. 1 are logical connections; the actual physical connections may be different. It is apparent to a person skilled in the art that the system typically comprises also other functions and structures than those shown in FIG. 1.

FIG. 1 shows a part of a radio access network of E-UTRA, LTE or LTE-Advanced (LTE-A) or LTE/SAE (SAE=system architecture evolution, SAE is enhancement of packet switched technology to cope with faster data rates and growth of Internet protocol traffic). E-UTRA is an air interface of Release 8 (UTRA=UMTS terrestrial radio access, UMTS=universal mobile telecommunications system). Some advantages obtainable by LTE (or E-UTRA) are a possibility to use plug and play devices, and Frequency Division Duplex (FDD) and Time Division Duplex (TDD) in the same platform.

The embodiments are not, however, restricted to the system given as an example but a person skilled in the art may apply the solution to other communication systems provided with the necessary properties. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), wideband code division multiple access (WCDMA), code division multiple access (CDMA), groupe spécial mobile or global system for mobile communications (GSM), enhanced data rates for GSM evolution (GSM EDGE or GERAN), systems using ultra-wideband (UWB) technology and different mesh networks. The embodiments are especially suitable for co-existence networks of two or more systems or layers of one or more systems. In the example of FIG. 1, a multilayer sharing or resources is expected and the system producing the layer capable to use a spectrum hole is depicted.

FIG. 1 shows user devices 100 and 102 configured to be in a wireless connection on one or more communication channels 104, 106 in a cell with a (e)NodeB 108 providing the cell. The physical link from a user device to a (e)NodeB is called uplink or reverse link and the physical link from the NodeB to the user device is called downlink or forward link.

The NodeB, or advanced evolved node B (eNodeB, eNB) in LTE-Advanced, is a computing device configured to control the radio resources of communication system it is coupled to. The (e)NodeB may also be referred to a base station, an access point or any other type of interfacing device including a relay station capable of operating in a wireless environment.

The (e)NodeB includes transceivers, for instance. From the transceivers of the (e)NodeB, a connection is provided to an antenna unit that establishes bi-directional radio links to user devices. The (e)NodeB is further connected to a core network 110 (CN). Depending on the system, the counterpart on the CN side can be a serving system architecture evolution (SAE) gateway (routing and forwarding user data packets), packet data network gateway (PDN GW), for providing connectivity to user devices (UEs) to external packet data networks, or mobile management entity (MME), etc.

The communication system is also able to communicate with other networks, such as a public switched telephone network or the Internet.

The user device illustrates one type of an apparatus to which resources on the air interface are allocated and assigned, and thus any feature described herein with a user device may be implemented with a corresponding apparatus. The user device may also be called a subscriber unit, mobile station, remote terminal, access terminal, user terminal or user equipment (UE) just to mention but a few names or apparatuses.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, laptop computer, game console, notebook, and multimedia device.

It should be understood that, in FIG. 1, user devices are depicted to include 2 antennas only for the sake of clarity. The number of reception and/or transmission antennas may naturally vary according to a current implementation.

Further, although the apparatuses have been depicted as single entities, different units, processors and/or memory units (not all shown in FIG. 1) may be implemented.

It is obvious for a person skilled in the art that the depicted system is only an example of a part of a radio access system and in practise, the system may comprise a plurality of (e)NodeBs, the user device may have an access to a plurality of radio cells and the system may comprise also other apparatuses, such as physical layer relay nodes or other network elements, etc. At least one of the NodeBs or eNodeBs may be a Home(e)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e)NodeB 108 of FIG. 1 may provide any kind of these cells. A cellular radio system may be implemented as a multilayer network including several kinds of cells. Typically, in multilayer networks, one node B provides one kind of a cell or cells, and thus a plurality of node Bs are required to provide such a network structure.

Recently for fulfilling the need for improving the deployment and performance of communication systems, concept of "plug-and-play" node (e)Bs has been introduced. Typically, a network which is able to use "plug-and-play" node (e)Bs, includes, in addition to Home node (e)Bs (Home(e)nodeBs), a home node B gateway, or HNB-GW (not shown in FIG. 1). A HNB Gateway (HNB-GW), which is typically installed within an operator's network aggregates traffic from a large number of HNBs back to a core network through Iu-cs and Iu-ps interfaces.

With increasing number of personal, local and wireless communication systems operating in a same geographical area, the questions of co-existence and inter-networking are raised. Cognitive and re-configurable radios may be a key for obtaining a heterogeneous communication environment where mitigation techniques and cognitive signalling are used for sharing the spectrum and routing information. Cognitive radios are designed to efficient spectrum use deploying so-called smart wireless devices being capable to sense and detect the environment and adapt to it thus being suitable for opportunistic spectrum usage, in which also the frequency bands not being used by their primary (usually licensed) users may be utilized by secondary users. For this purpose cognitive radios are designed to detect unused spectrum, such as spectrum holes.

The heterogeneous networks may also create new interference challenges due to the deployment of different wireless nodes such as macro/micro eNBs, pico eNBs, and Home eNBs creating a multi-layer network using the same spectrum resource.

In the following, an embodiment of a method for interference control is explained in further detail by means of FIG. 2. The embodiment is especially suitable for controlling inter-system and/or inter-layer interference in the situation of co-existence/sharing of systems and/or multi-layer networks. Co-existence/spectrum sharing is one of major challenges in open spectrum usage.

The embodiment starts in block 200.

In block 202, an interference estimate storage linking interference estimates of at least one primary communication entity and at least one secondary communication entity is created for interference management in resource sharing. The storage includes a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

An interference estimate storage may be based on a background interference matrix (BIM). Typically, a BIM table is used together with a radio resource usage table to obtain an impression of interference in real-time. The BIM table includes information on potential interference between cells and the radio resource table on actual radio resource usage.

In co-existence/sharing systems, radio resources, such as frequency spectrum and time, are shared or joint-used by multiple systems and/or layers. Thus interference not only within one system or layer has to be taken into account, but also interference from one system or layer to another one. Typically, in a geographical area, a system or layer which is a licensed user has a primary user status and possible ad-hoc users or opportunistic users which are ready to use spectrum holes or corresponding resources are called secondary users. Secondary users are typically not allowed to cause too much interference to primary users and thus they must have interference control which takes this into account.

The operability of a primary system and/or layer is "preferential" in respect of a secondary system and/or layer which means that the secondary system and/or layer is not allowed to interfere too much the primary system and/or layer. For example, a voice signal may be assumed to have a high priority and thus a system and/or layer transferring the voice signal may have a primary system status. In one deployment case of multi-layer networks, it is typically assumed that a wide area network (macro) layer is a primary layer and a local area layer or a part of it is a secondary layer.

A BIM table is designed to be used for interference estimation within one communication entity. However, as explained above, interference control between a plurality of communication entities is needed.

For this interference control, a system or layer construction may be organized as a communication combination by linking secondary system or layer cells to primary system or layer cells in such a manner that at least one secondary cell is linked to at least one primary cell. Each secondary system or layer cell is linked to one or more master cells. A master cell is typically a primary system or layer cell whose coverage area the secondary system or layer cell is located in. A master cell may have a plurality of secondary cells (cells of a secondary system and/or layer) and also the secondary cells may be linked to a plurality of master cells. A master cell may be defined as follows: when a user device is in a secondary cell under the coverage area of at least one master cell candidate, the master cell may be a primary system and/or level cell producing a neighbour cell measurement result which is the strongest one or at least above a predefined threshold value. The measurement results may be scaled ("normalized") if required for comparison.

In this application, systems and/or layers are called communication entities. Thus communication entities may be different radio access technologies, such as LTE, WiMAX or WLAN, etc, and/or different layers, such as a micro cell layer or femto cell layer, etc, or different combinations thereof.

In an embodiment, a secondary communication entity and a primary communication entity may be used simultaneously by means of a carrier aggregation. In this case both a master cell and a secondary communication entity cell may be involved in data transmission and/or reception. For example, in the case of LTE-Advanced, a master cell may, when carrier aggregation is involved, be called a primary component carrier (PCC) and a secondary cell a secondary component carrier, respectively. A user device-specific PCC may for example take care of carrying uplink layer 1 control information, carrying downlink layer 1 control information, carrying system information and carrying out handover process.

In another embodiment, a secondary communication entity may be used as standalone entity, such as a master cell.

In yet another embodiment, a secondary communication entity is used user device-specifically in such a manner that some user devices utilize radio resources of the secondary communication entity in combination with a primary communication entity whereas some other user devices utilize radio resources of the secondary communication entity which operates as a standalone communication entity.

In the interference storage of an embodiment one or more cells of a secondary communication entity are linked to one or more cells of a primary communication entity and one or more interference estimates of interference from the secondary communication entity to the primary communication entity are provided. The interference storage may also include interference estimates of interference caused by the primary communication entity.

The interference estimates may be gathered on the basis of interference measurements carried out by user devices, for instance. The interference measurements may be intra-system and/or inter-system measurements. Usually, user devices perform inter-system neighbour cell measurements during downlink and/or uplink idle periods that are provided by a network via discontinuous transmission and/or reception or packet scheduling. Location information of a user device may be used in the definition of the user device's cell dominance area. The location information may be based on neighbour-cell level measurements or positioning information obtainable for instance from a global positioning system (GPS).

The interference estimated may be cell-specific. As the number of available measurement results for a secondary cell may be relatively small in the beginning, the default values for secondary cell interference estimates of interference caused to primary cells may be set to the same value than interference estimates of interference caused between master cells. Then, based on measurements which will take place later, the interference estimates may be adapted to a more accurate value if needed.

It should be appreciated that secondary usage of radio resources is typically not allowed in a coverage area of a primary cell, if the resources are currently used by primary cells. However, it is an option to use other cells in the same geographical area or nearby, if power control is used to avoid too high interference to neighbouring primary system cells. Secondary system may have a dedicated frequency in order to enable continuous operation when sharing of resources is not possible.

The interference estimate storage may be located in operation and maintenance functions, typically in at least one memory, in a chosen network element, such as a server, host or node in a core network which takes care of interference management. Interference estimates may be received from a network node, or the network element responsible for the interference management may generate them based on measurement results it receives from the network node.

Information required for resource sharing may be distributed to the network nodes via specific operation and maintenance interfaces, X2, over the air information (OTAC) or extending current broadcast control channel (BCCH) info. In a cognitive radio case, information required for resource sharing may be distributed to network nodes via a cognitive pilot channel (CPC).

The interference estimate storage may be implemented as a multi-layer table typically stored in at least one memory. This table may be called as a multi-layer background interference matrix (MLBIM).

Figure 4A:
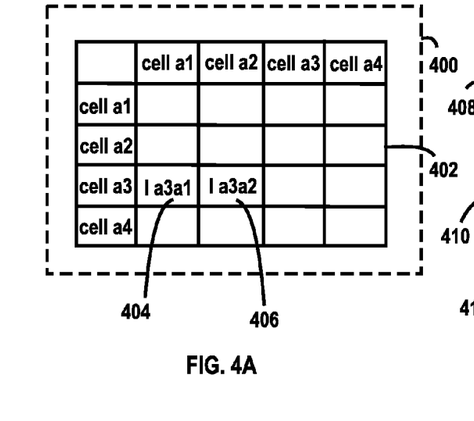
FIG. 4 shows an example of an interference estimate storage.

An example of the multi-layer table will be explained in further detail by means of FIGS. 4A and 4B. In the example, the information estimate storage 400 is a table. In FIG. 4A, the first layer 402 of the table (first table layer) is depicted. The first layer includes interference estimates of a primary communication entity. In location 404, an estimate for interference from cell 3 of communication entity "a" to cell 1 of communication entity "a" is provided, and in location 406, an estimate for interference from cell 3 of communication entity "a" to cell 2 of communication entity "a" is provided. That is to say the first layer comprises interference estimates within one primary communication entity.

Figure 4B:
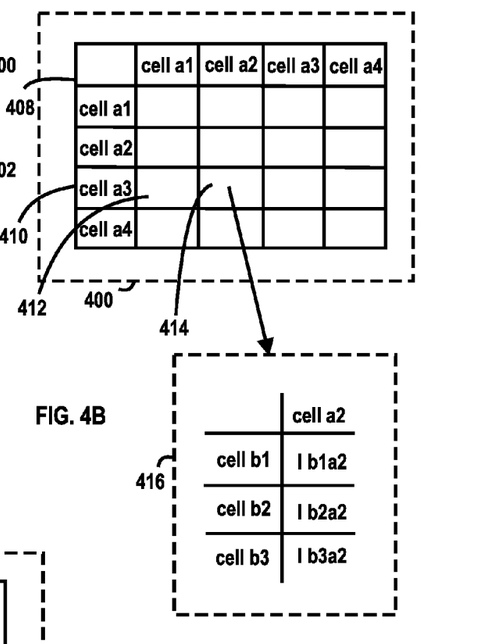

In FIG. 4B, the second layer of the exemplifying table is depicted. The second layer (second table layer) 408 includes interference estimates of interference a secondary communication entity "b" may cause to a primary communication entity "a". Master cells are marked column-wise and "normal" primary cells are marked row-wise. Cell "a3" is taken as an example of master cells 410. In location 412, interference estimates for interference from cells of communication entity "b" to communication entity "a" cell 1 are provided (not shown), and in location 414, interference estimates for interference from cells of communication entity "b" to communication entity "a" cell 2 are provided (shown as table 416). The table 416 shows an example of a possible content of the second table layer. In this example, master cell "a3" has three secondary cells "b1", "b2" and "b3", and the table 416 includes interference estimates for interference which may be caused by the cells "b1", "b2" and "b3" to the cell 2 of the primary communication entity "a".

It should be understood that the table of FIGS. 4A and 4B is only an example presented herein for clarification purposes, and it does not limit the implementation of embodiment by any means.

The embodiment ends in block 204. The embodiment is repeatable and one option for repetition is shown with arrow 206. Other options are naturally also possible.

In the following, an embodiment of the usage of the interference estimate storage is explained by means of FIG. 3.

The embodiment begins in block 300. An interference estimate storage may be used for interference management (or control).

In blocks 302A and 302B, a radio recourse status, idle or non-idle, is checked. This checking may be carried out in cell level of a primary communication entity. If the resource is not idle, but occupied by a primary communication entity, it cannot be taken into a secondary use. If the resource is idle, it can be taken into secondary use. Naturally, the status check may be targeted to a plurality of resources simultaneously or one after another.

The status may be checked from a radio resource usage information storage, such as a radio resource usage table. In a multi-RAT (RAT is an abbreviation of radio access technology) case, the radio resource storage (or information in it) may be divided in resource, such as frequency, blocks and interference power per each block may be estimated to provide a possibility to compare interference estimates from different RATs. For example, if GSM and UMTS systems are involved, a width of a GSM carrier is 200 kHz and a width of a UMTS carrier is approximately 5 MHz. Hence, only a part of the UMTS system interference affects to one GSM carrier. Thus, it may be advantageous to consider interference frequency block-wise. The interference estimate storage may include interference measurement results which are usable as such or they may be processed to generate interference estimates by using any suitable method. Other options for the format of the information also exist. The format typically varies according to radio access technologies involved.

In block 304, at least one interference estimate of interference from the at least one secondary communication entity to the at least one primary communication entity is generated from the interference estimate storage. The interference estimate may be generated for all primary communication entities the secondary communication entity may interfere. The generating may be reading ready-usable values from the table or it may include some processing, such as scaling, etc.

In block 306, an upper limit for transmission power for the at least one secondary communication entity is defined based on the at least one interference estimate. The upper limit may be defined on the basis of simulations made for evaluating possible effects of interference in a system or it may be based on measurements made in an existing network, etc. Interference which is beneath this upper limit or threshold or not over it is seen tolerable from the viewpoint of a primary communication entity.

In block 308, a transmission allowance message for the at least one secondary communication entity is generated. The message comprises information on the upper limit for transmission power. The message is typically transmitted to a network node serving a user device in question which then transmits allocation grant and power control messages to the user device. On the basis of the transmission allowance message, the user device may use a spectrum hole and transmission power which does not go over the upper limit.

The embodiment ends in block 310. The embodiment is repeatable and one option for repetition is shown with arrow 312. Other options are naturally also possible. The steps/points, signaling messages and related functions described above in FIGS. 2 and 3 are in no absolute chronological order, and some of the steps/points may be performed simultaneously or in an order differing from the given one. Other functions can also be executed between the steps/points or within the steps/points and other signaling messages sent between the illustrated messages. Some of the steps/points or part of the steps/points can also be left out or replaced by a corresponding step/point or part of the step/point.

It should be understood that transmitting and/or receiving may herein mean preparing a transmission and/or reception, preparing a message to be transmitted and/or received, or physical transmission and/or reception itself, etc on a case by case basis. In an embodiment, a server, node or host which is responsible for the interference estimate storage, receives interference measurement information and transmits resource allocation and/or power control information to other elements in the network.

An embodiment provides an apparatus which may be any node, host, server or any other suitable apparatus able to carry out processes described above in relation to FIGS. 2 and 3.

Figure 5:
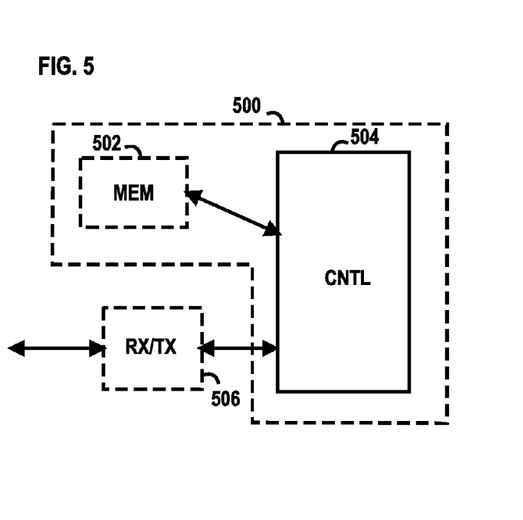
FIG. 5 shows an example of an apparatus.

FIG. 5 illustrates a simplified block diagram of an apparatus according to an embodiment especially suitable for interference management. It should be appreciated that the apparatus may also include other units or parts than those depicted in FIG. 5. Although the apparatus has been depicted as one entity, different modules and memory (one or more) may be implemented in one or more physical or logical entities.

The apparatus 500 may in general include at least one processor, controller or a unit designed for carrying out control functions operably coupled to at least one memory unit and to various interfaces. Further, a memory unit may include volatile and/or non-volatile memory. The memory unit may store computer program code and/or operating systems, information, data, content or the like for the processor to perform operations according to embodiments. Each of the memory units may be a random access memory, hard drive, etc. The memory units may be at least partly removable and/or detachably operationally coupled to the apparatus.

The apparatus may be a software application, or a module, or a unit configured as arithmetic operation, or as a program (including an added or updated software routine), executed by an operation processor. Programs, also called program products or computer programs, including software routines, applets and macros, can be stored in any apparatus-readable data storage medium and they include program instructions to perform particular tasks. Computer programs may be coded by a programming language, which may be a high-level programming language, such as objective-C, C, C++, Java, etc., or a low-level programming language, such as a machine language, or an assembler.

Modifications and configurations required for implementing functionality of an embodiment may be performed as routines, which may be implemented as added or updated software routines, application circuits (ASIC) and/or programmable circuits. Further, software routines may be downloaded into an apparatus. The apparatus, such as a node device, or a corresponding component, may be configured as a computer or a microprocessor, such as a single-chip computer element, or as a chipset, including at least a memory for providing storage capacity used for arithmetic operation and an operation processor for executing the arithmetic operation.

Figure 2:
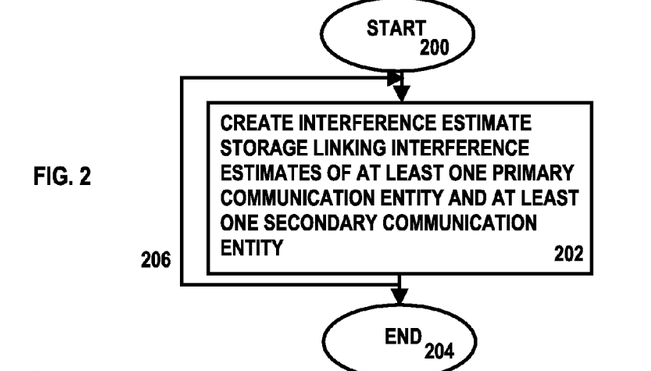
FIG. 2 is a flow chart.
Figure 3:
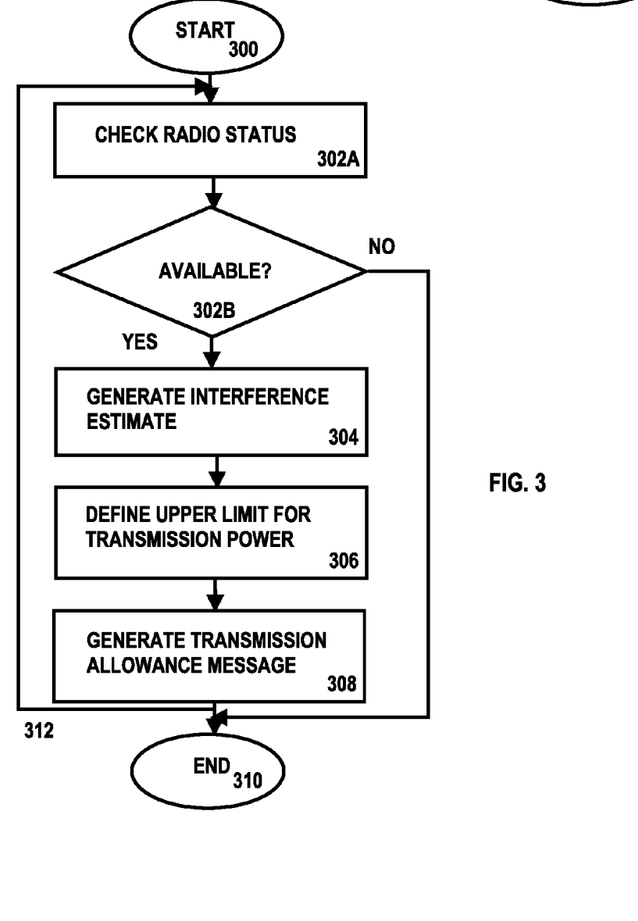
FIG. 3 is another flow chart.

As an example of an apparatus according to an embodiment, it is shown an apparatus, such as a node device, including facilities in a control unit 504 (including one or more processors, for example) to carry out functions of embodiments according to FIGS. 2 and 3. This is depicted in FIG. 5.

The apparatus may also include at least one processor 504 and at least one memory 502 including a computer program code, the at least one memory and the computer program code configured to, with the at least one processor, cause the apparatus at least to: create an interference estimate storage linking interference estimates of at least one primary and secondary communication entity for resource sharing, the storage comprising: a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

Another example of an apparatus comprises means 502, 504 for creating an interference estimate storage linking interference estimates of at least one primary and secondary communication entity for resource sharing, the storage comprising: a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity. Yet another example of an apparatus comprises a creator an interference estimate storage linking interference estimates of at least one primary and secondary communication entity for resource sharing, the storage comprising: a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

Embodiments of FIGS. 2 and 3 may be carried out in processor or control unit 504 possibly with aid of memory 502. An apparatus designed for using the interference estimate storage may also be the apparatus of FIG. 5 further comprising appropriate functionalities to check availability of a resource, and generate from the interference estimate storage an interference estimate of interference from the at least one secondary communication entity to the at least one primary communication entity, if the resource is available, define an upper limit for transmission power for the at least one secondary communication entity, and generate a transmission allowance message to the at least one secondary communication entity, the message comprising information on the upper limit for transmission power. The apparatus may thus include at least one processor 504 and at least one memory 502 including a computer program code, the at least one memory and the computer program code configured to, with the at least one processor, cause the apparatus at least to: check availability of a resource, generate from the interference estimate storage an interference estimate of interference from the at least one secondary communication entity to the at least one primary communication entity, if the resource is available, define an upper limit for transmission power for the at least one secondary communication entity, and generate a transmission allowance message to the at least one secondary communication entity, the message comprising information on the upper limit for transmission power.

Another example of an apparatus comprises means 502, 504 for checking availability of a resource, means 502, 504 for generating from the interference estimate storage an interference estimate of interference from the at least one secondary communication entity to the at least one primary communication entity, if the resource is available, means 502, 504 for defining an upper limit for transmission power for the at least one secondary communication entity, and means 502, 504 for generating a transmission allowance message to the at least one secondary communication entity, the message comprising information on the upper limit for transmission power.

Yet another example of an apparatus comprises a checking unit configured to check availability of a resource, a first generator configured to generate from the interference estimate storage an interference estimate of interference from the at least one secondary communication entity to the at least one primary communication entity, if the resource is available, a definer configured to define an upper limit for transmission power for the at least one secondary communication entity, and a second generator a transmission allowance message to the at least one secondary communication entity, the message comprising information on the upper limit for transmission power.

It should be appreciated that different units may be implemented as one module, unit, processor, etc, or as a combination of several modules, units, processor, etc.

It should be understood that the apparatuses may include other units or modules etc. used in or for transmission. However, they are irrelevant to the embodiments and therefore they need not to be discussed in more detail herein. Transmitting may herein mean transmitting via antennas to a radio path, carrying out preparations for physical transmissions or transmission control depending on the implementation, etc. The apparatus may utilize a transmitter and/or receiver which are not included in the apparatus itself, such as a processor, but are available to it, being operably coupled to the apparatus. This is depicted as an option in FIG. 5 as a transceiver 506. Embodiments provide computer programs embodied on a distribution medium, comprising program instructions which, when loaded into electronic apparatuses, constitute the apparatuses as explained above.

Other embodiments provide computer programs embodied on a computer readable medium, configured to control a processor to perform embodiments of the methods described above. The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital computer or it may be distributed amongst a number of computers.

The techniques described herein may be implemented by various means. For example, these techniques may be implemented in hardware (one or more devices), firmware (one or more devices), software (one or more modules), or combinations thereof. For a hardware implementation, the apparatus may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g., procedures, functions, and so on) that perform the functions described herein. The software codes may be stored in a memory unit and executed by processors. The memory unit may be implemented within the processor or externally to the processor. In the latter case it can be communicatively coupled to the processor via various means, as is known in the art. Additionally, the components of systems described herein may be rearranged and/or complimented by additional components in order to facilitate achieving the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The invention and its embodiments are not limited to the examples described above but may vary within the scope of the claims.

The invention claimed is:

1. An apparatus comprising:
    at least one processor and at least one memory including a computer program code, the at least one memory and the computer program code configured to, with the at least one processor, cause the apparatus at least to:
    create an interference estimate storage linking interference estimates of at least one primary communication entity and at least one secondary communication entity for interference management in resource sharing, the storage comprising:
    a plurality of storage layers of which at least one storage layer comprises one or more interference estimates of selected cells of the at least one primary communication entity and at least one other storage layer comprises one or more interference estimates of interference from the at least one secondary communication, entity to the at least one primary communication entity.

2. The apparatus of claim 1, wherein the at least one primary communication entity does not need to control interference to the at least one secondary communication entity, and the at least one secondary communication entity has to control interference to the at least one primary communication entity.

3. The apparatus of claim 1, wherein the at least one primary communication entity and the at least one secondary communication entity are organized as a communication combination by linking at least one secondary communication entity cell to at least one primary communication entity cell in such a manner that the at least one secondary communication entity cell is linked to the at least one primary communication entity cell.

4. The apparatus of claim 3, wherein the at least one primary communication entity cell used for linking is at least one master cell in a dominance area of which the at least one secondary cell is located, the at least one master cell fulfilling the following: a master cell is a primary communication entity cell producing a neighbour cell measurement result which is the strongest one or at least above a predefined threshold value.

5. The apparatus of claim 4, wherein the information estimate storage is a multi-layer table linking interference estimates of the at least one secondary communication entity cell to the at least one master cell.

6. The apparatus of claim 1, further configured to define the interference estimates by using user device measurement results obtained from intra-system and/or inter-system measurements, or user device location information.

7. The apparatus of claim 1, wherein the at least one secondary communication entity and the at least one primary communication entity are used simultaneously by means of a carrier aggregation.

8. The apparatus of claim 1, further comprising:
    at least one processor and at least one memory including a computer program code, the at least one memory and the computer program code configured to, with the at least one processor, cause the apparatus at least to:
    check availability of a resource;
    if available, generate from the interference estimate storage at least one interference estimate of interference from the at least one secondary communication entity to the at least one primary communication entity;
    define an upper limit for transmission power for the at least one secondary communication entity based on the at least one interference estimate, and
    generate a transmission allowance message for the at least one secondary communication entity, the message comprising information on the upper limit for transmission power.

9. The apparatus of claim 8, further configured to:
    check the availability of the resource from a radio resource usage storage, and in a multi radio access technology case,
    divide the radio resource storage in resource blocks, and
    estimate interference power per block for providing comparable interference estimates.

10. The apparatus of claim 1, the apparatus comprising a server, host or node device.

11. A method comprising:
    creating an interference estimate storage linking interference estimates of at least one primary communication entity and at least one secondary communication entity for interference management in resource sharing, the storage comprising:
    a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

12. The method of claim 11, wherein the at least one primary communication entity does not need to control interference to the at least one secondary communication entity, and the at least one secondary communication entity has to control interference to the at least one primary communication entity.

13. The method of claim 11, further comprising:
    organizing the at least one primary communication entity and the at least one secondary communication entity as a communication combination by linking at least one secondary communication entity cell to at least one primary communication entity cell in such a manner that the at least one secondary communication entity cell is linked to the at least one primary communication entity cell.

14. The method of claim 13, wherein the at least one primary communication entity cell used for linking is at least one master cell in a dominance area of which the at least one secondary cell is located, the at least one master cell fulfilling the following: a master cell is a primary communication entity cell producing a neighbour cell measurement result which is the strongest one or at least above a predefined threshold value.

15. The method of claim 14, wherein the information estimate storage is a multi-layer table linking interference estimates of the at least one secondary communication entity cell to the at least one master cell.

16. The method of claim 11, further comprising: defining the interference estimates by using user device measurement results obtained from intra-system and/or inter-system measurements, or user device location information.

17. The method of claim 11, further comprising: using the at least one secondary communication entity and the at least one primary communication entity simultaneously by means of a carrier aggregation.

18. The method of claim 11, further comprising:
checking availability of a resource;
if available,
  generating from the interference estimate storage at least one interference estimate of interference from the at least one secondary communication entity to the at least one primary communication entity;
  defining an upper limit for transmission power for the at least one secondary communication entity based on the at least one interference estimate, and
  generating a transmission allowance message for the at least one secondary communication entity, the message comprising information on the upper limit for transmission power.

19. The method of claim 18, further comprising:
checking the availability of the resource from a radio resource usage storage, and in a multi radio access technology case,
dividing the radio resource storage in resource blocks, and
estimating interference power per block for providing comparable interference estimates.

20. A computer program embodied on a non-transitory computer-readable storage medium, the computer program comprising program code for controlling a process to execute a process, the process comprising:
  creating an interference estimate storage linking interference estimates of at least one primary communication entity and at least one secondary communication entity for interference management in resource sharing, the storage comprising:
  a plurality of storage layers of which at least one storage layer comprises one or more interference estimates of selected cells of the at least one primary communication entity and at least one other storage layer comprises one or more interference estimates of interference from the at least one secondary communication entity to the at least one primary communication entity.

21. The computer program of claim 20, wherein the at least one primary communication entity does not need to control interference to the at least one secondary communication entity, and the at least, one secondary communication entity has to control interference to the at least one primary communication entity.

22. The computer program of claim 20, further comprising:
organizing the at least one primary communication entity and the at least one secondary communication entity as a communication combination by linking at least one secondary communication entity cell to at least one primary communication entity cell in such a manner that the at least one secondary communication entity cell is linked to the at least one primary communication entity cell.

23. The computer program of claim 22, wherein the at least one primary communication entity cell used for linking is at least one master cell in a dominance area of which the at least one secondary cell is located, the at least one master cell fulfilling the following: a master cell is a primary communication entity cell producing a neighbour cell measurement result which is the strongest one or at least above a predefined threshold value.

24. The computer program of claim 23, wherein the information estimate storage is a multi-layer table linking interference estimates of the at least one secondary communication entity cell to the at least one master cell.

25. The computer program of claim 20, further comprising:
defining the interference estimates by using user device measurement results obtained from intra-system and/or inter-system measurements, or user device location information.

26. The computer program of claim 20, further comprising:
using the at least one secondary communication entity and the at least one primary communication entity simultaneously by means of a carrier aggregation.

27. The computer program of claim 20, further comprising:
checking availability of a resource;
if available,
  generating from the interference estimate storage at least one interference estimate of interference from the at least one secondary communication entity to the at least one primary communication entity;
  defining an upper limit for transmission power for the at least one secondary communication entity based on the at least one interference estimate, and
  generating a transmission allowance message for the at least one secondary communication entity, the message comprising information on the upper limit for transmission power.

28. The computer program of claim 27, further comprising:
checking the availability of the resource from a radio resource usage storage, and in a multi radio access technology case,
dividing the radio resource storage in resource blocks, and
estimating interference power per block for providing comparable interference estimates.

* * * * *